United States Patent [19]

Wohlrab

[11] Patent Number: 5,781,605
[45] Date of Patent: Jul. 14, 1998

[54] IMAGE RECONSTRUCTION METHOD AND ARITHMETIC UNIT FOR A COMPUTED TOMOGRAPHY APPARATUS

[75] Inventor: Juergen Wohlrab, Forchheim, Germany

[73] Assignee: Siemens Aktiengesellschaft, Munich, Germany

[21] Appl. No.: 840,870

[22] Filed: Apr. 17, 1997

[30] Foreign Application Priority Data

Apr. 29, 1996 [DE] Germany .................. 196 17 162.8

[51] Int. Cl.$^6$ ................................. A61B 6/03
[52] U.S. Cl. ................... 378/4; 378/901; 600/425
[58] Field of Search ................ 378/4, 15, 901; 600/425

[56] References Cited

U.S. PATENT DOCUMENTS

| | | | |
|---|---|---|---|
| 4,707,786 | 11/1987 | Dehner | 378/14 |
| 5,654,995 | 8/1997 | Flohr | 378/10 |
| 5,701,360 | 12/1997 | Flohr | 382/131 |
| 5,703,920 | 12/1997 | Wohlrab | 378/4 |

*Primary Examiner*—David P. Porta
*Assistant Examiner*—David Vernon Bruce
*Attorney, Agent, or Firm*—Hill & Simpson

[57] ABSTRACT

In a computed tomography apparatus with a volume reconstruction by a three-dimensional gridding algorithm an arithmetic unit and method for operating same are provided for efficiently implementing the three-dimensional gridding algorithm. In this arithmetic unit and method, randomly-distributed supporting points SP are weighted in the frequency space in order to be able to apply a 3D gridding algorithm for a three-dimensional Fourier reconstruction for a computed tomography apparatus. An ASIC is provided wherein the supporting point weighting and the 3D gridding algorithm are efficiently implemented.

5 Claims, 5 Drawing Sheets

IMAGE RECONSTRUCTION METHOD AND ARITHMETIC UNIT FOR A COMPUTED TOMOGRAPHY APPARATUS

BACKGROUND OF THE INVENTION

1. Field of the Invention

The present invention is directed to the field of computed tomography, and more specifically to a method and arithmetic unit for image reconstruction of the type employing a three-dimensional Fourier reconstruction.

2. Description of the Prior Art

It is well-known in computed tomography to obtain fan projections of data by scanning an examination subject. The fan projections can be converted into parallel projections by suitable interpolation in a known manner.

Two reconstruction algorithms, convolution backprojection and Fourier reconstruction, are known for the reconstruction of a tomogram of the subject from parallel projections. A three-dimensional Fourier reconstruction for volume reconstruction can be derived therefrom.

A gridding algorithm is known for the two-dimensional Fourier reconstruction. The gridding algorithm describes the transition from the polar grid to the Cartesian grid in the two-dimensional frequency space. An arithmetic unit for the implementation of a two-dimensional Fourier reconstruction is disclosed in German Patent Application 195 38 053.3 corresponding to co-pending U.S. application Ser. No. 08/717,604, filed Sep. 23, 1996 ("Computed Tomography Apparatus with Image Production Using Fourier Reconstruction," Wohirab et al.), assigned to the same assignee (Siemens AG) as the present application.

The two-dimensional gridding process can be expanded to a three-dimensional gridding process. The 3D gridding algorithm describes the transition from supporting points generally not lying in the Cartesian grid to a three-dimensional Cartesian frequency grid. The volume to be reconstructed can be determined by three-dimensional back-transformation from the frequency domain into the location domain.

SUMMARY OF THE INVENTION

The present invention has the following objects:
a) Design of a suitable method for determining the weights of the supporting points that generally do not lie in the Cartesian grid for a 3D gridding process.
b) Efficient realization of the method of a).
c) Efficient realization of the 3D gridding process for a three-dimensional Fourier reconstruction in computer tomography.

The above objects are achieved in a method and an arithmetic unit for weighting randomly-distributed supporting points in frequency space in order to apply a 3D algorithm for a 3D Fourier reconstruction in a computed tomography apparatus, wherein a 3D pre-gridding process is undertaken wherein a weighting cube is generated. In the 3D pre-gridding process, all supporting points are initially assigned a function value of 1.0, and subsequent function values are respectively obtained for each supporting point representing distribution inhomogeneities of the supporting points. Each supporting point contributes N values in each of the x, y and z directions of the Cartesian weighting cube. The weighting for a given supporting point is determined from the x, y and z points of the weighting cube for that supporting point which lie in the three-dimensional interpretation window of the three-dimensional gridding process. The function values of the weighting cube are converted into function values by a reciprocal value formation with suitable limitation of the output values, and with each of the points of the weighting cube being multiplied by interpolation weightings in each of the x, y and z directions, with the results being added.

Special hardware in the form of an arithmetic unit for volume gridding with application specific integrated circuits (VGR-ASIC) is employed in the inventive computed tomography method and apparatus for efficient implementation of the method for determining the weights of the supporting points that generally do not lie in the Cartesian grid and of the 3D gridding algorithm.

DESCRIPTION OF THE PREFERRED EMBODIMENTS

Figure 1:
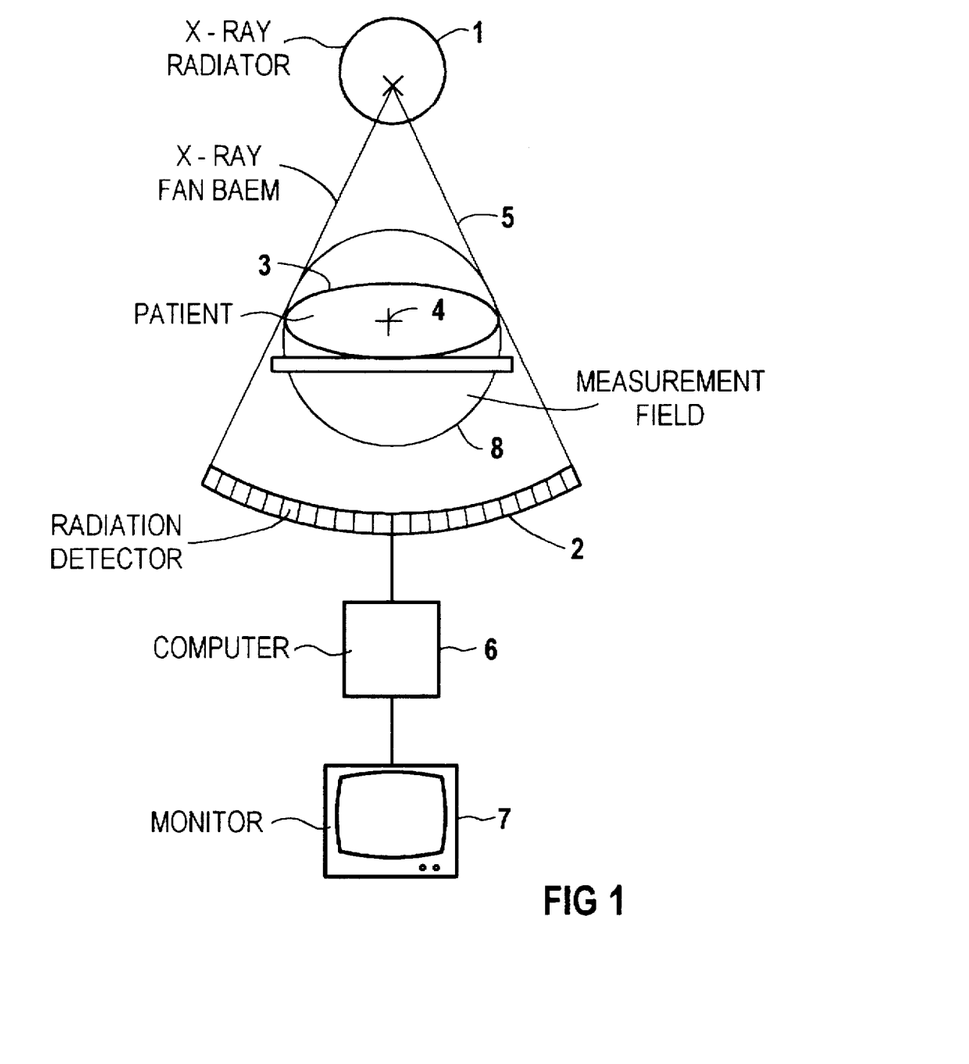
FIG. 1 is a schematic illustration of the basic components of a computed tomography apparatus with fan beam for explaining the invention.

FIG. 1 shows an x-ray radiator 1 and a detector 2 composed of a matrix of detector elements. For scanning a subject 3, the x-ray radiator components 1 and the detector 2 rotate around a system axis 4, so that the subject 3 is transirradiated from different directions by a fan-shaped X-ray beam 5 emanating from the x-ray radiator 1. The data supplied by the detector elements of the detector 3 are supplied to a computer 6 that reconstructs tomograms within the transirradiated volume of the subject 3 that are displayed on a monitor 7. The subject 3 lies in a measurement field 8 covered by the X-ray beam 5.

Presentation of the calculating steps of the 3D gridding algorithm: The calculating steps of the 3D gridding algorithm derive from an analogy to the known gridding algorithm for the two-dimensional case.

The 3D gridding algorithm can only be applied when the function values of the supporting points generally not lying in the Cartesian grid have already been suitably weighted.

Figure 2:
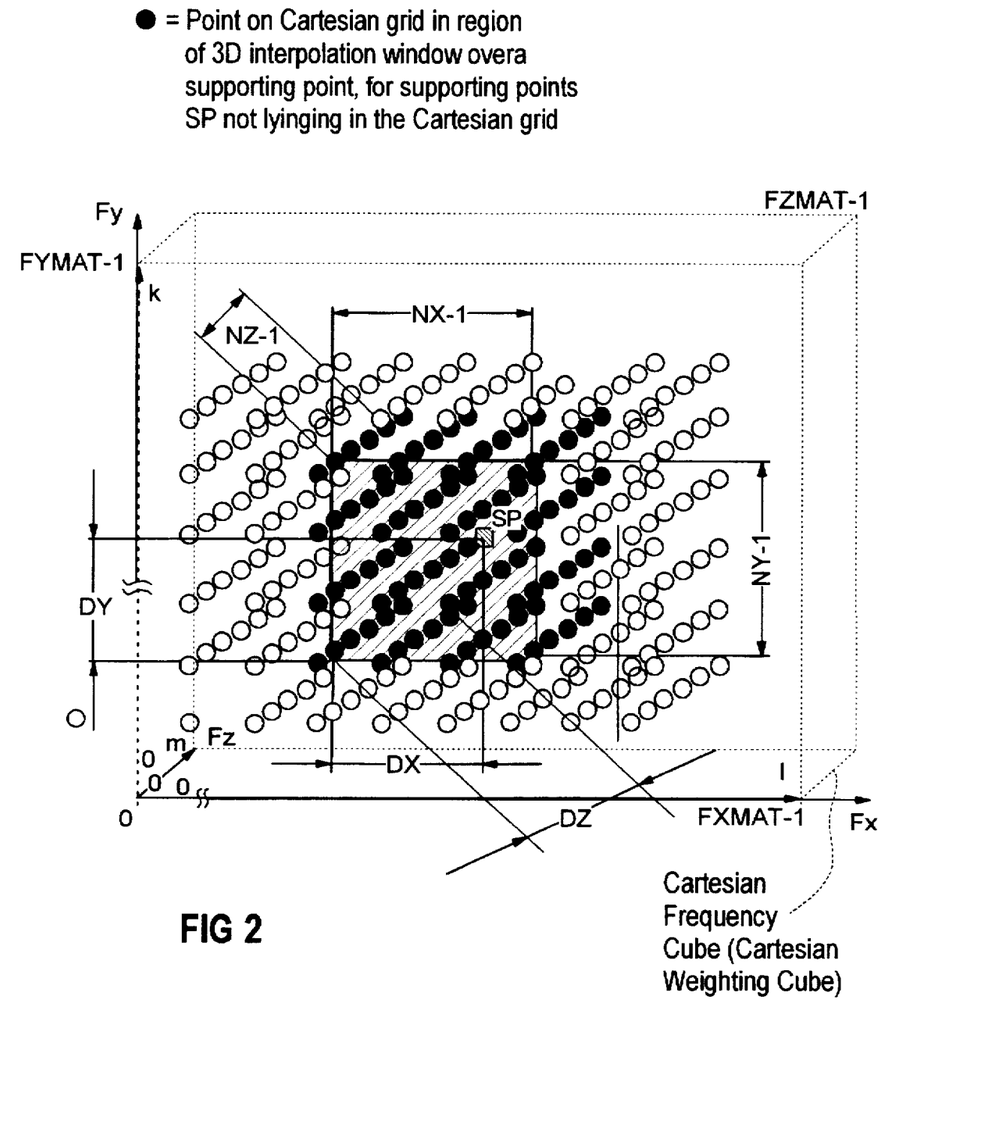
FIGS. 2–5 are graphic illustrations for explaining details of the invention.

In the 3D gridding algorithm, each point contributes to NX*NY*NZ points of the Cartesian grid of the Cartesian frequency cube. In FIG. 2, the contribution of a supporting point SP generally, not lying in the Cartesian grid, to the Cartesian frequency cube is shown with reference to NX=NY=NZ=4.

The Cartesian frequency cube has the dimension FMATX*FMATY*FMATZ (see FIG. 2). A complex element of the Cartesian frequency cube is referenced below with FM[m] [k] [l].

At the beginning of the 3D gridding algorithm, the elements of the Cartesian frequency cube are initialized with the value 0.0+j0.0.

All of the following calculation steps must be carried out for each supporting point SP that generally does not lie in the Cartesian grid.

Determination of the coordinates of the corner point UP(FXUP,FYUP,FXUP) from the coordinates of the supporting point SP(FXSP,FYSP,FZSP) generally not lying in the Cartesian grid:
<A1.>FXUP is the x-coordinate of the left, lower, front Cartesian grid point UP in the three-dimensional interpolation window (1 subtraction with rounding)

<A2.>FYUP is the y-coordinate of the left, lower, front Cartesian grid point UP in the three-dimensional interpolation window (1 subtraction with rounding)

<A3.>FZUP is the z-coordinate of the left, lower, front Cartesian grid point UP in the three-dimensional interpolation window (1 subtraction with rounding)

Determination of the auxiliary quantities DX, DY and DZ:

<A4.>DX=FXSP−FXUP (1 subtraction)
<A5.>DY=FYSP−FYUP (1 subtraction)
<A6.>DZ=FZSP−FZUP (1 subtraction)

The whole-number run variable i subsequently used in the steps <A7.>through <A30.>runs from i=0 to i=NX−1.

The whole-number run variable j subsequently used in the steps <A7.>through <A30.>runs from j=0 to j=NY−1.

The whole-number run variable h subsequently used in the steps <A7.>through <A30.>runs from h=0 to h=NZ−1.

The index region of the interpolation table INTTABL in the direction of I runs from pl=0 to pl=LINTPL−1, the index region of the interpolation table INTTABK in the direction of k runs from pk=0 to pk=LINTPK−1, the index region of the interpolation table INTTABM in the direction m runs from pm=0 to pm=LINTPM−1.

This includes the specific case that all three interpolation tables are the same and interpolation is the same in all three directions.

Determination of the access indices px[i], py[j] and pz[h] onto the interpolation tables INTTABL, INTTABK and INTTABM with the respective lengths LINTPL, LINTPK, LINTPM:

<A7.>px|i] is the absolute value of (DX+1)*LINTPL*2/NX rounded to the next whole number (1 rounding, 1 multiplication and NX−1 additions; the value LINTPL*2/NX represents a constant and only has to be calculated once)

<A8.>py|j] is the absolute value of (DY+j)*LINTPK*2/NY rounded to the next whole number (1 rounding, 1 multiplication and NY−1 additions; the value LINTPK*2/NY represents a constant and only has to be calculated once)

<A9.>pz[h] is the absolute value of (DZ+h)*LINTPK*2/NZ rounded to the next whole number (1 rounding, 1 multiplication and NZ−1 additions; the value LINTPM*2/NZ represents a constant and only has to be calculated once)

Addressing the values lx[i], ly[j] and lz[h] of the interpolation tables at the identified access indices px[i], py[j] and pz[h|:

<A10.>lx[i] is the value of the interpolation table INTTABL at the access index px[i] (NX accesses to the interpolation table INTTABL)

<A11.>ly[j] is the value of the interpolation table INTTABK at the access index py[j] (NY accesses to the interpolation table INTTABK)

<A12.>lz[h] is the value of the interpolation table INTTABM at the access index pz[h] (NZ accesses to the interpolation table INTTABM)

Calculation of the access indices zl[i], zk[j] and zm|h| of the elements of the Cartesian frequency cube that are located in the three-dimensional interpolation window of the supporting point generally not lying in the Cartesian grid:

<A13.>pl[i]=FXUP+i (NX additions)
<A14.>pk[j]=FYUP+j (NY additions)
<A15.>pm[h]=FZUP+h (NZ additions)

<A16.>zl[i]={pl[i] is imaged modulo onto the region [0,FMATX−1]}

<A17.>zk[j]={pk[j] is imaged modulo onto the region [0,FMATY−1]}

<A18.>zm|h|={pm|h| is imaged modulo onto the region [0,FMATZ−1]}

Addressing of the values FMZ[zm[h]] [zk[j]] [zl[i]] of the elements of the Cartesian frequency cube that are located in the three-dimensional interpolation window of the supporting point generally not lying in the Cartesian grid:

<A19.>FMZ_RE[zm[h]] [zk[j]] [zl[i]] is the real part value of the store of the Cartesian frequency cube FM|zm[h]| [zk[j]] [zl[i]] (NX*NY*NZ accesses to Cartesian frequency cube)

<A20.>FMZ_IM|zm[h]| [zk[j]] [zl[i]] is the imaginary part value of the store of the Cartesian frequency cube FM|zm[h]] [zk[j]] [zl[i]] (NX*NY*NZ accesses to Cartesian frequency cube)

SP_RE is the real part of the supporting point SP generally not lying in the Cartesian grid.

SP_IM is the imaginary part of the supporting point SP generally not lying in the Cartesian grid.

Calculation of the supplements ZU_RE|h| [j] [i] and ZU_IM[h] [j] [i] to the elements of the Cartesian frequency cube that lie in the three-dimensional interpolation window of the supporting point SP generally not lying in the Cartesian grid:

<A21.>ZUX_RE|i]=SP_RE * lx|i] (NX multipications)
<A22.>ZUX_IM[i]=SP_IM * lx|i] (NX multiplications)
<A23.>ZU_RE[j][i]=ZUX_RE[i] * ly[j] (NY*NX multiplications)
<A24.>ZU_IM[j][i]=ZUX_IM[i] * ly[j] (NY*NX multiplications)
<A25.>ZU_RE[h]|j][i]=ZUX_RE[j][i] * lz[h] (NZ*NY*NX multiplications)
<A26.>ZU_IM[h]|j][i]=ZUX_IM[j][i] * lz[h] (NZ*NY*NX multiplications)

Formation of the supplements to the elements of the Cartesian frequency cube that lie in the three-dimensional interpolation window of the supporting point generally not lying in the Cartesian grid:

<A27.>FMZE_RE[zm[h]][zk[j]][zl[i]]=FMZ_RE[zm[h]] [zk[j]][zl[i]]+ZU_RE[h][j][i] (NX*NY*NZ additions)

<A28.>FMZE_IM|zm[h]][zk[j]][zl[i]]=FMZ_IM|zm[h]] [zk[j]][zl[i]]+ZU_IM[h][j][i] (NX*NY*NZ additions)

Transfer of the calculated values into the store of the Cartesian frequency cube:

<A29.>The real part of the memory cell FM[zm[h]][zk[j]] [zl[i]] in the Cartesian frequency cube is overwritten with the newly calculated value FMZE_RE[zm[h]][zk[j]][zl[i]]. (NX*NY*NZ accesses to Cartesian frequency cube)

<A30.>The imaginary part of the memory cell FM[zm[h]] [zk[j]][zl[i]] in the Cartesian frequency cube is overwritten with the newly calculated value FMZE_IM[zm[h]] [zk[j]][zl[i]]. (NX*NY*NZ accesses to Cartesian frequency cube)

Method for determining the weights of the supporting points generally not lying in the Cartesian grid:

The 3D gridding algorithm describes the transition from supporting points generally not lying in the Cartesian grid onto a three-dimensional Cartesian frequency grid. It is thereby assumed that the supporting points SP generally not lying in the Cartesian grid are randomly distributed in the frequency cube. This requires a suitable weighting of the supporting points generally not lying in the Cartesian grid before the implementation of the 3D griddinh process in order to compensate distribution inhomogeneities. The function values of the frequency cube in regions having a higher supporting point density would otherwise be elevated compared to the function values in regions having lower supporting point density.

The method invented therefor for weighting the supporting points generally not lying in the Cartesian grid is as follows:

1. 3D pre-gridding process: Implementation of the 3D pre-gridding process, whereby the function value 1.0 is taken for all supporting points SP instead of the actual function value. The result of the 3D pre-gridding process is a real weighting cube FMG in a Cartesian grid wherein the function values describe the distribution inhomogeneities of the supporting points SP.

In the 3D pre-gridding algorithm, each point contributes to NX*NY*NZ points KR of the Cartesian grid of the Cartesian weighting cube FMG just as in the 3D gridding algorithm. Just as in the 3D gridding, the interpolation tables INTTABL(x), INTTABK(y) and INTTABM(z) are employed for the 3D pre-gridding, whereby x, y and z represent the spacing between a Cartesian grid point KR and the supporting point SP.

2. Weighting interpolation: The weight GEW for a supporting point SP is determined from the NX*NY*NZ points KRG of the weighting cube FMG that lie in the three-dimensional interpolation window of the 3D gridding process. The function values FKRG of the point KRG are converted into functions values FKRGK with an evaluation function BF for this purpose. The evaluation function BF thereby essentially performs a reciprocal value formation with suitable limitation of the output values. The weight GEW is determined from the function values FKGRK of the points KRG as follows: Each function value FKRGK of the points KRG is multiplied by the corresponding interpolations weightings INTTABL(x) *INTTABK(y)*INTTABM(z), and the results are added up. The final result is the weight GEW with x, y and z represent the spacing between the respective Cartesian grid point of the points KRG and the supporting point SP.

Presentation of the calculating steps of the 3D pre-gridding process: The calculating steps of the 3D pre-gridding derive from an analogy to the 3D gridding algorithm. The critical difference compared to the 3D gridding algorithm is comprised therein that the function value 1.0 is taken for all supporting points SP in the 3D pre-gridding instead of the actual function value. In the 3D pre-gridding algorithm, each point contributes to NX*NY*NZ points of the Cartesian grid of the Cartesian weighting cube. The Cartesian weighting cube is real. The contribution of a supporting value [sic] SP generally not lying in the Cartesian grid onto the Cartesian weighting bus is shown in FIG. 2 on the basis of NX=NY=NZ=4.

The Cartesian weighting cube has the dimension FMATX*FMATY*FMATZ (see FIG. 2). A real element of the Cartesian weighting cube is referenced below as FMG [m] [k] [l].

At the beginning of the 3D pre-gridding algorithm, the elements of the Cartesian weighting cube are initialized with the value 0.0. All of the following calculating steps must be carried out for each supporting value SP generally not lying in the Cartesian grid.

Determination of the coordinates of the corner point UP(FXUP,FYUP,FXUP) from the coordinates of the supporting point SP(FXSP,FYSP,FZSP) generally not lying in the Cartesian grid:

<B1.>FXUP is the x-coordinate of the left, lower, front Cartesian grid point UP in the three-dimensional interpolation window (1 subtraction with rounding)

<B2.>FYUP is the y-coordinate of the left, lower, front Cartesian grid point UP in the three-dimensional interpolation window (1 subtraction with rounding)

<B3.>FZUP is the z-coordinate of the left, lower, front Cartesian grid point UP in the three-dimensional interpolation window (1 subtraction with rounding)

Determination of the auxiliary quantities DX, DY and DZ:

<B4.>DX=FXSP−FXUP (1 subtraction)
<B5.>DY=FYSP−FYUP (1 subtraction)
<B6.>DZ=FZSP−FZUP (1 subtraction)

The whole-number run variable i subsequently used in the steps <B7.>through <B23.>runs from i=0 to i=NX−1.

The whole-number run variable j subsequently used in the steps <B7.>through <B23.>runs from j=0 to j=NY−1.

The whole-number run variable h subsequently used in the steps <B7.>through <B23.>runs from h=0 to h=NZ−1.

The index region of the interpolation table INTTABL in the direction of l runs from pl=0 to pl=LINTPL−1, the index region of the interpolation table INTTABK in the direction of k runs from pk=0 to pk=LINTPK−1, and the index region of the interpolation table INTTABM in the direction m runs from pm=0 to pm=LINTPM−1.

This includes the specific case that all three interpolation tables are the same and interpolation is the same in all three directions. Determination of the access indices px[i], py[j] and pz[h] onto the interpolation tables INTTABL, INTTABK and INTTABM with the respective lengths LINTPL, LINTPK, LINTPM:

<B7.>px[i] is the absolute value of (DX+i)*LINTPL*2/NX rounded to the next whole number (1 rounding, 1 multiplication and NX−1 additions; the value LINTPL*2/NX represents a constant and only has to be calculated once)

<B8.>py[j] is the absolute value of (DY+j)*LINTPK*2/NY rounded to the next whole number (1 rounding, 1 multiplication and NY−1 additions; the value LINTPK*2/NY represents a constant and only has to be calculated once)

<B9.>pz[h] is the absolute value of (DZ+h)*LINTPK*2/NZ rounded to the next whole number (1 rounding, 1 multiplication and NZ−1 additions; the value LINTPM*2/NZ represents a constant and only has to be calculated once)

Addressing the values lx[i], ly[j] and lz[h] of the interpolation tables at the identified access indices px[i], py[j] and pz[h]:

<B10.>lx[i] is the value of the interpolation table INTTABL at the access index px[i] (NX accesses to the interpolation table INTTABL)

<B11.>ly[j] is the value of the interpolation table INTTABK at the access index py[j] (NY accesses to the interpolation table INTTABK)

<B12.>lz[h] is the value of the interpolation table INTTABM at the access index pz[h] (NZ accesses to the interpolation table INTTABM)

Calculation of the access indices zl[i], zk[j] and zm[h] of the elements of the Cartesian weighting cube that are located in the three-dimensional interpolation window of the supporting point generally not lying in the Cartesian grid:

<B13.>pl[i]=FXUP+i (NX additions)
<B14.>pk[j]=FYUP+j (NY additions)
<B15.>pm[h]=FZUP+h (NZ additions)

<B16.>zl[i]={pl[i] is imaged modulo onto the region [0,FMATX−1]}

<B17.>zk[j]={pk[j] is imaged modulo onto the region [0,FMATY−1]}

<B18.>zm[h]={pm[h] is imaged modulo onto the region [0,FMATZ−1]}

Addressing of the values FMG[zm[h]][zk[j]][zl[i]] of the elements of the Cartesian weighting cube that are located in the three-dimensional interpolation window of the supporting point generally not lying in the Cartesian grid:

<B19.>FMG[zm[h]][zk[j]][zl[i]] is the value for the storage of the Cartesian frequency cube (NX*NY*NZ accesses to Cartesian frequency cube)

Calculation of the supplements ZU[h][j][i] to the elements of the Cartesian weighting cube that lie in the three-dimensional interpolation window of the supporting point SP generally not lying in the Cartesian grid:

<B20.>ZUX[j][i]=lx[i] * ly[j] (NY*NX multipications)

<B21.>ZU[h][j][i]=ZUX[j][i] * lz[h] (NZ*NY*NX multiplications)

Formation of the supplements to the elements of the Cartesian weighting cube that lie in the three-dimensional interpolation window of the supporting point generally not lying in the Cartesian grid:

<B22.>FMZG[zm[h]][zk[j]][zl[i]]=FMG[zm[h]][zk[j]][zl[i]]+ZU[h][j][i] (NX*NY*NZ additions)

Transfer of the calculated values into the store of the Cartesian weighting cube:

<B23.>The memory cell FMG[zm[h]][zk[j]][zl[i]] in the Cartesian weighting cube is overwritten with the newly calculated value FMZG[zm[h]][zk[j]][zl[i]] (NX*NY*NZ accesses to Cartesian weighting cube)

Presentation of the calculating steps of the weight interpolation: The calculating steps of the method of weight interpolation already presented are described here.

In the weight interpolation, the weight for a supporting point SP generally not lying in the Cartesian grid is determined from the NX*NY*NZ points (see FIG. 2) of the Cartesian grid of the Cartesian weighting cube FMG by interpolation. A valid Cartesian weighting matrix is needed for the implementation of the weighting interpolation. The Cartesian weighting matrix is determined by the 3D pre-gridding or is loaded as table for a known supporting point distribution.

The Cartesian weighting cube has the dimension FMATX*FMATY*FMATZ (see FIG. 2). A real element of the Cartesian weighting cube is referenced below as FMG [m][k][l].

All of the following calculating steps must be carried out for each supporting value SP(FXSP,FYSP,FZSP) generally not lying in the Cartesian grid.

Determination of the coordinates of the corner point UP(FXUP,FYUP,FXUP) from the coordinates of the supporting point SP(FXSP,FYSP,FZSP) generally not lying in the Cartesian grid:

<C1.>FXUP is the x-coordinate of the left, lower, front Cartesian grid point UP in the three-dimensional interpolation window (1 subtraction with rounding)

<C2.>FYUP is the y-coordinate of the left, lower, front Cartesian grid point UP in the three-dimensional interpolation window (1 subtraction with rounding)

<C3.>FZUP is the z-coordinate of the left, lower, front Cartesian grid point UP in the three-dimensional interpolation window (1 subtraction with rounding)

Determination of the auxiliary quantities DX, DY and DZ:

<C4.>DX=FXSP−FXUP (1 subtraction)

<C5.>DY=FYSP−FYUP (1 subtraction)

<C6.>DZ=FZSP−FZUP (1 subtraction)

The whole-number run variable i subsequently used in the steps <C7.>through <C23.>runs from i=0 to i=NX−1.

The whole-number run variable j subsequently used in the steps <C7.>through <C23.>runs from j=0 to j=NY−1.

The whole-number run variable h subsequently used in the steps <C7.>through <C23.>runs from h=0 to h=NZ−1.

The index region of the interpolation table INTTABL in the direction of l runs from pl=0 to pl=LINTPL−1, the index region of the interpolation table INTTABK in the direction of k runs from pk=0 to pk=LINTPK−1, and the index region of the interpolation table INTTABM in the direction m runs from pm=0 to pm=LINTPM−1.

This includes the specific case that all three interpolation tables are the same and interpolation is the same in all three directions.

Determination of the access indices px[i], py[j] and pz[h] onto the interpolation tables INTTABL, INTTABK and INTTABM with the respective lengths LINTPL, LINTPK, LINTPM:

<C7.>px[i] is the absolute value of (DX+i)*LINTPL*2/NX rounded to the next whole number (1 rounding, 1 multiplication and NX−1 additions; the value LINTPL*2/NX represents a constant and only has to be calculated once)

<C8.>py[j] is the absolute value of (DY+j)*LINTPK*2/NY rounded to the next whole number (1 rounding, 1 multiplication and NY−1 additions; the value LINTPK*2/NY represents a constant and only has to be calculated once)

<C9.>pz[h] is the absolute value of (DZ+h)*LINTPM*2/NZ rounded to the next whole number (1 rounding, 1 multiplication and NZ−1 additions; the value LINTPM*2/NZ represents a constant and only has to be calculated once)

Addressing the values lx[i], ly[j] and lz[h] of the interpolation tables at the identified access indices px[i], py[j] and pz[h]:

<C10.>lx[i] is the value of the interpolation table INTTABL at the access index px[i] (NX accesses to the interpolation table INTTABL)

<C11.>ly[j] is the value of the interpolation table INTTABK at the access index py[j] (NY accesses to the interpolation table INTTABK)

<C12.>lz[h] is the value of the interpolation table INTTABM at the access index pz[h] (NZ accesses to the interpolation table INTTABM)

Calculation of the access indices zl[i], zk[j] and zm[h] of the elements of the Cartesian weighting cube that are located in the three-dimensional interpolation window of the supporting point generally not lying in the Cartesian grid:

<C13.>pl[i]=FXUP+i (NX additions)

<C14.>pk[j]=FYUP+j (NY additions)

<C15.>pm[h]=FZUP+h (NZ additions)

<C16.>zl[i]={pl[i] is imaged modulo onto the region [0,FMATX−1]}

<C17.>zk[j]={pk[j] is imaged modulo onto the region [0,FMATY−1]}

<C18.>zm[h]={pm[h] is imaged modulo onto the region [0,FMATZ−1]}

Addressing of the values FMG[zm[h]][zk[j]][zl[i]] of the elements of the Cartesian weighting cube that are located in the three-dimensional interpolation window of the supporting point generally not lying in the Cartesian grid:

<C19.>FMG|zm[h]| |zk[j]| |zl[i]| is value for the storage of the Cartesian frequency cube (NX*NY*NZ accesses to Cartesian frequency cube)

Calculation of the weighting GEW(FXSP,FYSP,FZSP) of the supporting point SP(FXSP,FYSP,FZSP) generally not lying in the Cartesian grid:

<C20.>IXY|j| |i| =Ix[i] * ly[j] (NY*NX multiplications)

<C21.>I|h| |j| |i| =IXY|j| |i| * lz|h| (NZ*NY*NX multiplications)

<C22.>conversion of the values FMG|zm|h|| |zk[j]| |zl[i]| read in step <C19.>with the operator that realizes the evaluation function BF.

FMGBW|zm[h]| |zk[j]| |zl[i]| =BW(FMG|zm[h]| |zk[j]| |zl[i]|) (NX*NY*NZ operations) Insofar as the elements of the weighting matrix FMG are replaced after the 3D pre-gridding by the value FMGBW evaluated with the evaluation function BW, the calculating step <C22.>in the weighting interpolation can be omitted.

<C23.>multiplication of the values FMGBW |zm|h|| |zk[j]| |zl[i]| with the corresponding interpolation weighting I [h] [j] [i] and addition of the results.

The result is the weight GEW(FXSP,FYSP,FZSP). (NZ*NY*NX multiplications, NZ*NY*MX-1 additions)

SP_RE(FXSP,FYSP,FZSP) is the real part of the function value of the supporting point SP(FXSP,FYSP,FZSP) generally not lying in the Cartesian grid.

SP_IM(FXSP,FYSP,FZSP) is the imaginary part of the function value of the supporting point SP(FXSP,FYSP,FZSP) generally not lying in the Cartesian grid.

Weighting of the supporting point SP(FXSP,FYSP,FZSP):

<C24.>GSP_RE(FXSP,FYSP,FZSP)=SP_RE(FXSP,FYSP,FZSP) * GEW(FXSP,FYSP,FZSP) (1 multiplication)

<C25.>GSP_IM(FXSP,FYSP,FZSP)=SP_IM(FXSP,FYSP,FZSP) * GEW(FXSP,FYSP,FZSP) (1 multiplication).

Processing sequence of 3D pre-gridding, weighting interpolation and 3D gridding:

The advantage of the disclosed method for determining the weights of the supporting points generally not lying in the Cartesian grid is comprised therein that the calculating steps <C1.>through <C18.>of the weighting interpolation are identical to the calculating steps <A1.>through <A18.>of the 3D gridding process. As a result, the determination of the weights of the supporting points generally not lying in the Cartesian grid can be very efficiently implemented in conjunction with the 3D gridding process.

The result is a 3D gridding process with step-by-step weighting interpolation:

a) For a supporting point SP, the calculating steps <A1.>through <A18.>of the 3D gridding are implemented first. The calculating steps <C1.>through <C18.>of the weighting interpolation are thus also automatically implemented.

b) The weighting GEW with which the function value of the supporting point SP must be weighted for the implementation of the 3D gridding is subsequently determined with <C19.>through <C23.>. The weighting of the function value of the supporting point SP then ensues in step <C24.>and <C25.>.

c) The calculating steps <A19.>through <A30.>of the 3D gridding algorithm are then implemented.

A valid Cartesian weighting matrix is needed for the implementation of the weighting interpolation and of the 3D gridding process. The Cartesian weighting matrix is determined by the 3D pre-gridding or is loaded as table for a known supporting point distribution.

When the weighting interpolation and the 3D gridding are to be successively implemented for a plurality of reconstructions, and when the distribution of the supporting points SP generally not lying in the Cartesian grid remains respectively the same, then the 3D pre-gridding only has to be implemented before the weighting interpolation of the first reconstruction. The Cartesian weighting matrix generated in the 3D pre-gridding is then valid for all reconstructions with the same distribution of the supporting points SP generally not lying in the Cartesian grid. The Cartesian weighting matrix could also be loaded as table for a known distribution of the supporting points SP.

When the distribution of the supporting points SP generally not lying in the Cartesian grid is different in a plurality of reconstructions, the a respective 3D pre-gridding must be implemented before the weighting interpolation and the 3D gridding.

Presentation of the calculating steps of the 3D gridding algorithm implemented in the VGR-ASIC with step-by-step weighting interpolation: The calculating steps of the 3D gridding algorithm with step-by-step weighting interpolation that are to be implemented in the VGR-ASIC are described here. In the 3D gridding algorithm, each point contributes to NX*NY*NZ points of the Cartesian grid of the Cartesian frequency cube. In FIG. 2, the contribution of a supporting point SP generally not lying in the Cartesian grid onto |sic| the Cartesian frequency cube is shown with reference to NX=NY=NZ=4. The Cartesian frequency cube has the dimension FMATX*FMATY*FMATZ (see FIG. 2). A complex element of the Cartesian frequency cube is referenced below with FM|m| |k| |l|.

At the beginning of the 3D gridding algorithm, the elements of the Cartesian frequency cube are initialized with the value 0.0+j0.0.

All of the following calculation steps must be carried out for each supporting point SP that generally does not lie in the Cartesian grid.

Determination of the coordinates of the corner point UP(FXUP,FYUP,FXUP) from the coordinates of the supporting point SP(FXSP,FYSP,FZSP) generally not lying in the Cartesian grid:

<D1.>FXUP is the x-coordinate of the left, lower, front Cartesian grid point UP in the three-dimensional interpolation window (1 subtraction with rounding)

<D2.>FYUP is the y-coordinate of the left, lower, front Cartesian grid point UP in the three-dimensional interpolation window (1 subtraction with rounding)

<D3.>FZUP is the z-coordinate of the left, lower, front Cartesian grid point UP in the three-dimensional interpolation window (1 subtraction with rounding)

Determination of the auxiliary quantities DX, DY and DZ:

<D4.>DX=FXSP-FXUP (1 subtraction)

<D5.>DY=FYSP-FYUP (1 subtraction)

<D6.>DZ=FZSP-FZUP (1 subtraction)

The whole-number run variable i subsequently used in the steps <D7.>through <D37.>runs from i=0 to i=NX-1.

The whole-number run variable j subsequently used in the steps <D7.>through <D37.>runs from j=0 to j=NY-1.

The whole-number run variable h subsequently used in the steps <D7.>through <D37.>runs from h=0 to h=NZ-1.

The index region of the interpolation table INTTABL in the direction of I runs from pl=0 to pl=LINTPL-1, the index region of the interpolation table INTTABK in the direction of k runs from pk=0 to pk=LINTPK−1, and the index region of the interpolation table INTTABM in the direction m runs from pm=0 to pm=LINTPM−1.

This includes the specific case that all three interpolation tables are the same and interpolation is the same in all three directions.

Determination of the access indices px[i], py[j] and pz[h] onto the interpolation tables INTTABL, INTTABK and INTTABM with the respective lengths LINTPL, LINTPK, LINTPM:

<D7.>px[i] is the absolute value of (DX+1)*LINTPL*2/NX rounded to the next whole number
  (1 rounding, 1 multiplication and NX−1 additions; the value LINTPL*2/NX represents a constant and only has to be calculated once)
<D8.>py[j] is the absolute value of (DY+j)*LINTPK*2/NY rounded to the next whole number
  (1 rounding, 1 multiplication and NY−1 additions; the value LINTPK*2/NY represents a constant and only has to be calculated once)
<D9.>pz[h] is the absolute value of (DZ+h)*LINTPK*2/NZ rounded to the next whole number
  (1 rounding, 1 multiplication and NZ−1 additions; the value LINTPM*2/NZ represents a constant and only has to be calculated once)

Addressing the values lx[i], ly[j] and lz[h] of the interpolation tables at the identified access indices px[i], py[j] and pz[h]:

<D10.>lx[i] is the value of the interpolation table INTTABL at the access index px[i] (NX accesses to the interpolation table INTTABL)
<D11.>ly[j] is the value of the interpolation table INTTABK at the access index py[j] (NY accesses to the interpolation table INTTABK)
<D12.>lz[h] is the value of the interpolation table INTTABM at the access index pz[h] (NZ accesses to the interpolation table INTTABM)

Calculation of the access indices zl[i], zk[j] and zm[h] of the elements of the Cartesian frequency cube that are located in the three-dimensional interpolation window of the supporting point generally not lying in the Cartesian grid:

<D13.>pl[i]=FXUP+i (NX additions)
<D14.>pk[j]=FYUP+j (NY additions)
<D15.>pm[h]=FZUP+h (NZ additions)
<D16.>zl[i]={pl[i] is imaged modulo onto the region [0,FMATX−1]}
<D17.>zk[j]={pk[j] is imaged modulo onto the region [0,FMATY−1]}
<D18.>zm[h]={pm[h] is imaged modulo onto the region [0,FMATZ−1]}

Addressing of the values FMG[zm[h]] [zk[j]] [zl[i]] of the elements of the Cartesian weighting cube that are located in the three-dimensional interpolation window of the supporting point generally not lying in the Cartesian grid:

<D19.>FMG[zm[h]] [zk[j]] [zl[i]] is value for the storage of the Cartesian frequency cube (NX*NY*NZ accesses to Cartesian frequency cube)

Calculation of the weighting GEW of the supporting point SP generally not lying in the Cartesian grid:

<D20.>IXY[j] [i]=lx[i] * ly[j] (NY*NX multiplications)
<D21.>I[h] [j] [i]=IXY[j] [i] * lz[h] (NZ*NY*NX multiplications)
<D22.>conversion of the values FMG[zm[h]] [zk[j]] [zl[i]] read in step <D19.>with the operator that realizes the evaluation function BF.

FMGBW[zm[h]] [zk[j]] [zl[i]]=BW(FMG[zm[h]] [zk[j]] [zl[i]]) (NX*NY*NZ operations)

Insofar as the elements of the weighting matrix FMG are replaced after the 3D pre-gridding by the value FMGBW evaluated with the evaluation function BW, the calculating step <D22.>in the weighting interpolation can be omitted. <D23.>multiplication of the values FMGBW [zm[h]] [zk[j]] [zl[i]] with the corresponding interpolation weighting I [h] [j] [i] and addition of the results. The result is the weight GEW. (NZ*NY*NX multiplications, NZ*NY*MX−1 additions)

SP_RE is the real part of the function value of the supporting point SP generally not lying in the Cartesian grid.
SP_IM is the imaginary part of the function value of the supporting point SP generally not lying in the Cartesian grid.
Weighting of the supporting point SP:

<D24.>GSP_RE=SP_RE * GEW (1 multiplication)
<D25.>GSP_IM=SP_M * GEW (1 multiplication).

Addressing of the values FMZ[zm[h]] [zk[j]] [zl[i]] of the elements of the Cartesian frequency cube that are located in the three-dimensional interpolation window of the supporting point generally not lying in the Cartesian grid:

<D26.>FMZ_RE[zm[h]] [zk[j]] [zi[i]] is the real part value for the storage of the Cartesian frequency cube FM[zm[h]] [zk[j]] [zl[i]] (NX*NY*NZ accesses to Cartesian frequency cube)
<D27.>FMZ_IM[zm[h]] [zk[j]] [zl[i]] is the imaginary part value for the storage of the Cartesian frequency cube FM[zm[h]] [zk[j]] [zl[i]] (NX*NY*NZ accesses to Cartesian frequency cube)

Calculation of the supplements ZU_RE[h] [j] [i] and ZU_IM[h] [j] [i] to the elements of the Cartesian frequency cube that lie in the three-dimensional interpolation window of the supporting point SP generally not lying in the Cartesian grid:

<D28.>ZUX_RE[i]=GSP_RE * lx[i] (NX multiplcations)
<D29.>ZUX_IM[i]=GSP_IM * lx[i] (NX multiplications)
<D30.>ZU_RE[j][i]=ZUX_RE[i] * ly[j] (NY*NX multiplications)
<D31.>ZU_IM[j][i]=ZUX_IM[i] * ly[j] (NY*NX multiplications)
<D32.>ZU_RE[h][j][i]=ZUX_RE[j][i] lz[h] (NZ*NY*NX multiplications)
<D33.>ZU_IM[h][j][i]=ZUX_IM[j][i] lz[h] (NZ*NY*NX multiplications)

Formation of the supplements to the elements of the Cartesian frequency cube that lie in the three-dimensional interpolation window of the supporting point generally not lying in the Cartesian grid:

<D34.>FMZE_RE[zm[h]][zk[j]][zl[i]]=FMZ_RE[zm[h]] [zk[j]][zl[i]]+ZU_RE[h][j][i] (NX*NY*NZ additions)
<D35.>FMZE_IM[zm[h]][zk [j]][zl[i]]=FMZ_IM[zm[h]] [zk[j]][zl[i]] +ZU_IM[h][j][i] (NX*NY*NZ additions)

Transfer of the calculated values into the store of the Cartesian frequency cube:

<D36.>The real part of the memory cell FM[zm[h]][zk [j]][zl[i]] in the Cartesian frequency cube is overwritten with the newly calculated value FMZE_RE[zm[h]][zk [j]][zl[i]]. (NX*NY*NZ accesses to Cartesian frequency cube)
<D37.>The imaginary part of the memory cell FM[zm[h]] [zk[j]][zl[i]] in the Cartesian frequency cube is overwritten with the newly calculated value FMZE_IM[zm[h]| [zk[j]][zl[i]]. (NX*NY*NZ accesses to Cartesian frequency cube)

Interfaces of the VGR-ASIC:

For implementation of the 3D pre-gridding algorithm, the Cartesian coordinates (FX, FY, FZ) of the supporting values in the frequency domain are needed as input data. The output data of the 3D pre-gridding algorithm is [sic] the Cartesian weighting cube.

For implementation of the 3D gridding algorithm with weighting interpolation, the Cartesian weighting matrix FMG and the function values of the supporting points SP generally not lying in the grid as well as the Cartesian coordinates (FX, FY, FZ) of the supporting points SP in the frequency domain are needed as input data. The output data of the 3D gridding algorithm is |sic| the Cartesian frequency cube.

Both the function values of the supporting values |sic| SP as well as the data of the Cartesian frequency cube FM are complex. The data of the Cartesian weighting matrix FMG are real.

Two versions are proposed for the transfer of the Cartesian coordinates of the supporting values SP to the VGR-ASIC:

VK1: Coordinate transfer, version 1: The Cartesian coordinates (FX, FY, FZ) of the supporting values SP are respectively written into coordinate input buffers of the VGR-ASIC after the supporting values are handed over. Version 1 of the coordinate transfer is also suitable for reconstruction algorithms wherein the coordinates of supporting values successively handed over to the VGR-ASIC are not in a relationship that can be described by constant coordinate increments DFX, DFY and DFZ.

VK2: Coordinate transfer, version 2: The supporting values SP of a projection spectrum are transferred into the VGR-ASIC in a block transfer. It is assumed that the coordinates of supporting points SP successively transferred to the VGR-ASIC within the transfer block can be defined by constant coordinate increments DFX, DFY and DFZ. At the beginning of the block transfer, the setup values indicated below and from which the VGR-ASIC can itself generate the Cartesian coordinates of the supporting values SP transferred in the block transfer are transferred to the VGR-ASIC:

the Cartesian coordinate increments DFX, DFY and DFZ between the supporting values transferred in the block transfer, and the number of supporting values with appertaining direction in the block transfer.

Version 2 of the coordinate transfer is not suitable for reconstructions algorithms wherein the coordinates of supporting values successively transferred to the VGR-ASIC are not in a relationship that an be described by constant coordinate increments.

Figure 3:
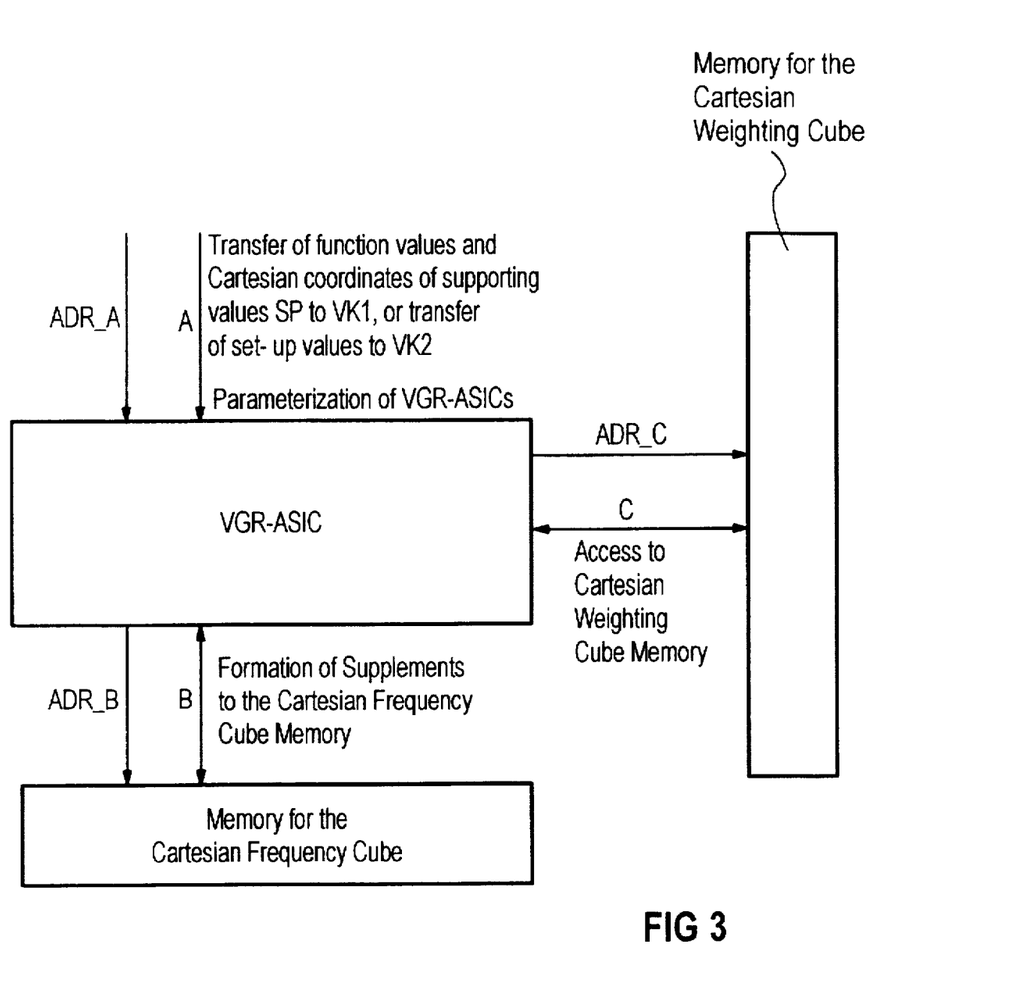

The function values of the supporting values SP and the Cartesian coordinates (FX, FY, FZ) of the supporting values SP, or the appertaining set-up values, are then written into different input buffers of the VGR-ASIC via a data bus A (see FIG. 3). A FIFO principle is recommended for the input buffers.

The operating mode of the VGR-ASIC (3D pre-gridding or 3D gridding with step-by-step weighting interpolation), the interpolation tables and the parameters that are required for the 3D gridding algorithm and the 3D pre-gridding algorithm are loaded via the data bus A during an initialization phase.

The address bus ADR__A serves for addressing the various input buffers and the interpolation table memories.

By read-modify-write accesses via the bidirectional data bus B, the VGR-ASIC forms supplements to random data with the address RAND of the memory SKART in which the Cartesian frequency cube is located. The appertaining address RAND is generated by the VGR-ASIC and placed onto the address bus ADR__B via which the memory of the Cartesian frequency cube is addressed.

By read-modify-write accesses via the bidirectional data bus C, the VGR-ASIC forms supplements to random data with the address RANDG of the memory SKARTG in which the Cartesian weighting cube is located. The appertaining address RANDG is generated by the VGR-ASIC and placed onto the address bus ADR__C via which the memory of the Cartesian weighting cube is addressed.

Figure 4:
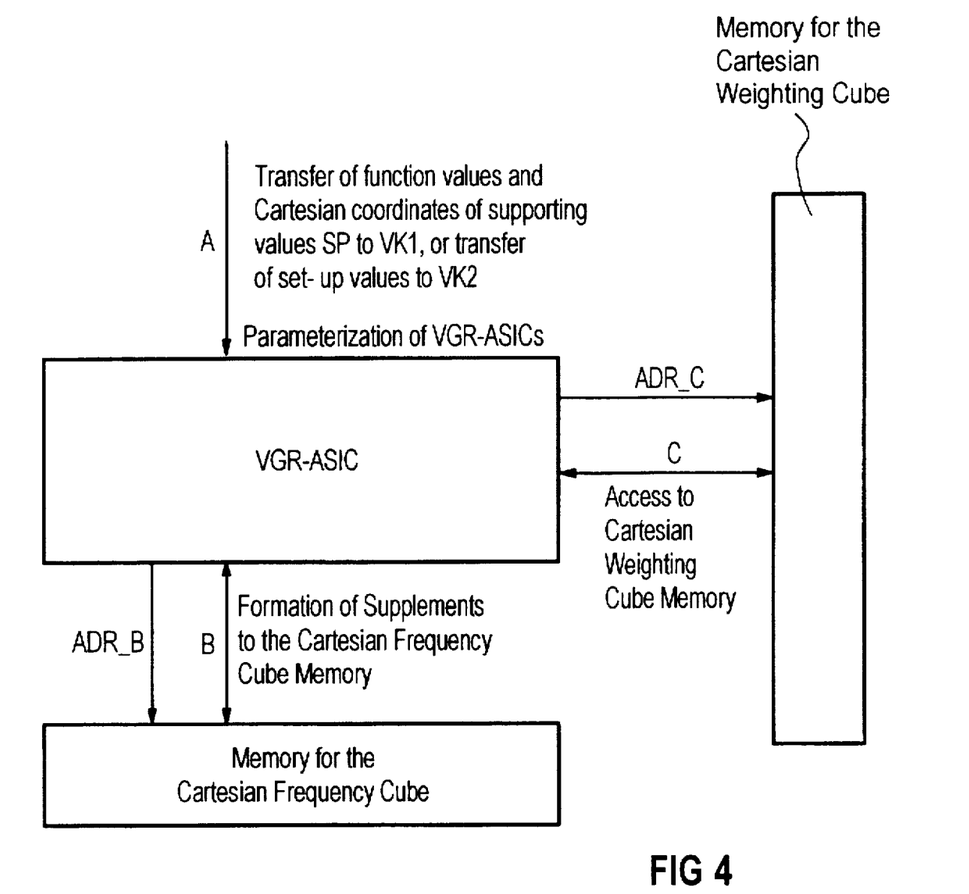

FIG. 4 shows an illustration of the interfaces of a further version of the VGR-ASIC that manages without the address bus ADR__A. In this case, the addresses belonging to the data would have to be co-transmitted on the data bus A. Imaging of the calculating steps onto the components of the VGR-ASIC:

The imaging of the calculating steps onto the components of the VGR-ASIC shall be presented here on the basis of the 3D gridding with step-by-step weighting interpolation. The imaging of the calculating steps of the 3D pre-gridding can be derived therefrom as follows:

The calculating steps <B1.> through <B18.> correspond to the calculating steps <D1.> through <D18.> with the respectively same number. The calculating step <B19.> corresponds to the calculating step <D26.>. The calculating step <B20.> corresponds to the calculating step <D30.>. The calculating step <B21.> corresponds to the calculating step <D32.>. The calculating step <B22.> corresponds to the calculating step <D34.>. The calculating step <B23.> corresponds to the calculating step <D36.>.

A number of NX*NY*NZ accesses on the bus C is necessary according to calculating step <D19.>. The accesses on the bus C can ensue parallel to the accesses on the bus B.

In order to keep the number of accesses on the bus B as low as possible, the real and imaginary parts of the Cartesian frequency cube are accessed in parallel via the bus B.

A total of 2*NX*NY*NZ accesses to the bus B are thus required for the processing of a supporting point SP. These are composed as follows: a) Calculating step <26.> and >D27.> parallel: 2*NX*NY*NZ accesses, b) Calculating step <D36.> and <D37.> parallel: 2*NX*NY*NZ accesses.

Figure 5:
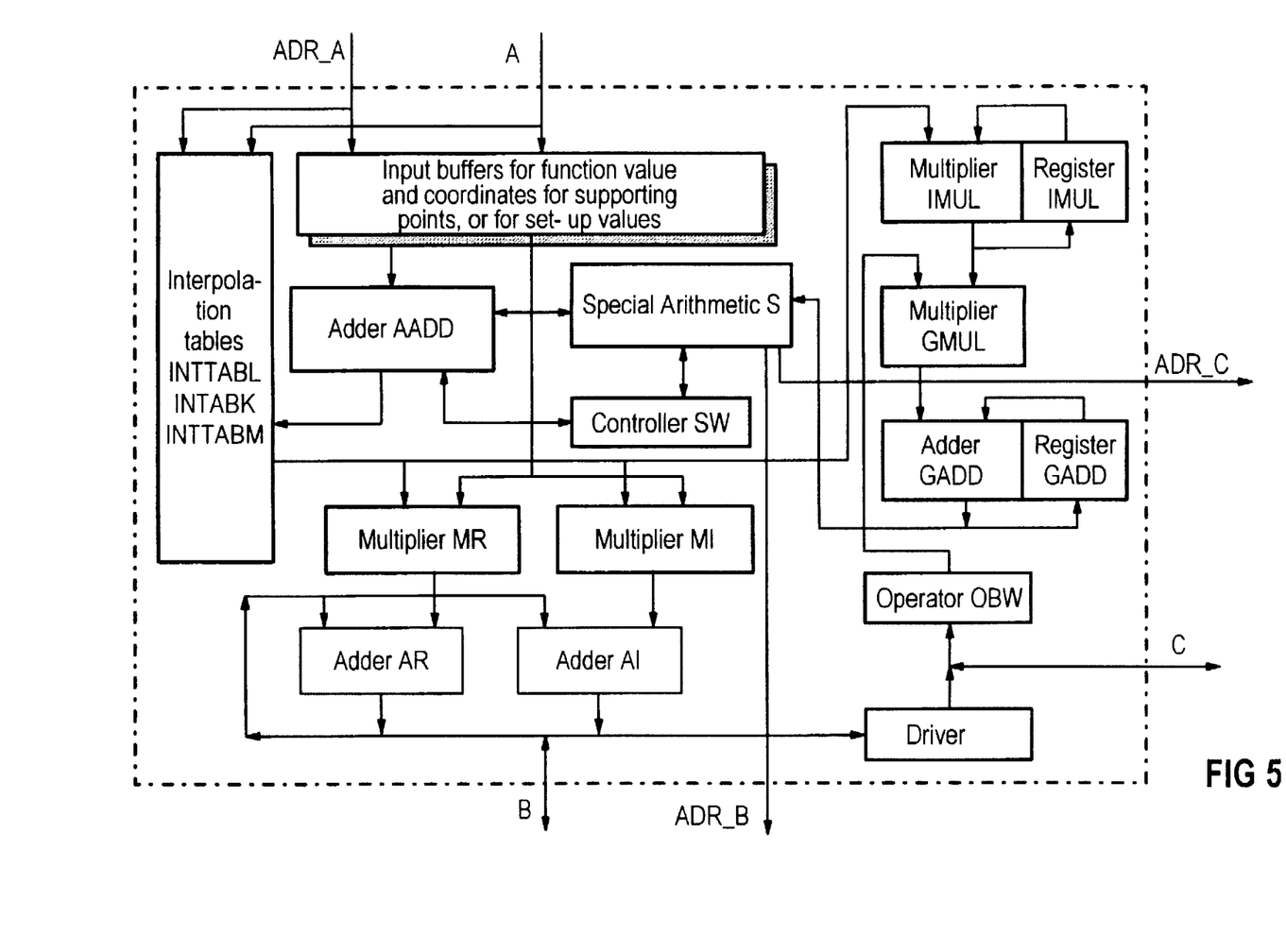

FIG. 5 shows an illustration of the function blocks of the VGR-ASIC with selected data paths. The calculating elements (see FIG. 5) of the VGR-ASIC are designed such in terms of the processing capacity so that all calculating steps are "hidden" behind the 2*NX*NY*NZ accesses to the bus B.

The number of accesses to the bus B thus determines the processing capacity of the VGR-ASIC. If it is assumed that each access to the bus B has the duration of a calculating clock, the VGR-ASIC has a processing capacity of 2*NX*NY*NZ calculating clocks for the processing of a supporting value SP.

A possible division of the calculating steps <D1.> through <D37.> onto the functions blocks shown in FIG. 5 is presented below. The workload of the function block for processing a supporting point SP is thereby respectively indicated in the form of calculating clocks:

Adder AADD:

+1 subtraction of calculating step <D1.>: 1 calculating clock

+1 subtraction of calculating step <D2.>: 1 calculating clock

+1 subtraction of calculating step <D3.>: 1 calculating clock

+1 subtraction of calculating step <D4.>: 1 calculating clock

+1 subtraction of calculating step <D5.>: 1 calculating clock

+1 subtraction of calculating step <D6.>: 1 calculating clock

+NX−1 additions of calculating step <D7.>: NX−1 calculating clocks

+NY−1 additions of calculating step <D8.>: NY−1 calculating clocks

+NZ−1 additions of calculating step <D9.>: NZ−1 calculating clocks

+NX additions of calculating step <D13.>: NX calculating clocks

+NY additions of calculating step <D14.>: NY calculating clocks

+NZ additions of calculating step <D15.>: NZ calculating clocks

Total number of calculating clocks of adder AADD:

$$2*(NX+NY+NZ)+3$$

Special arithmetic S:
  +1 rounding of calculating step <D1.>: 1 calculating clock
  +1 rounding of calculating step <D2.>: 1 calculating clock
  +1 rounding of calculating step <D3.>: 1 calculating clock
  +1 rounding of calculating step <D7.>: 1 calculating clock
  +1 rounding of calculating step <D8.>: 1 calculating clock
  +1 rounding of calculating step <D9.>: 1 calculating clock
  +1 multiplication of calculating step <D7.>: 1 calculating clock
  +1 multiplication of calculating step <D8.>: 1 calculating clock
  +1 multiplication of calculating step <D9.>: 1 calculating clock
  +NX modulo calculations of calculating step <D16.>: NX calculating clocks
  +NY modulo calculations of calculating step <D17.>: NY calculating clocks
  +NZ modulo calculations of calculating step <D18.>: NY [sic] calculating clocks
  +1 multiplication of calculating step <D24.>: 1 calculating clock
  +1 multiplication of calculating step <D25.>: 1 calculating clock Total number of calculating steps of special arithmetic S:

$$NX+NY+NZ+11$$

Access to interpolation tables INTTABL, INTTABK and INTTABM:
  +NX accesses of calculating step <D10.>: NX calculating clocks
  +NY accesses of calculating step <D11.>: NY calculating clocks
  +NZ accesses of calculating step <D12.>: NZ calculating clocks Total number of calculating steps given access to interpolation tables INTTABL, INTTABK and INTTABM: NX+NY+NZ Multiplier MR:
  +NX multiplications of calculating step <D28.>: NX calculating clocks
  +NX*NY multiplications of calculating step <D30.>: NX*NY calculating clocks
  +NX*NY*NZ multiplications of calculating step <D32.>: NX*NY*NZ calculating clocks Total number of calculating steps of multiplier MR:

$$NX+NX*NY+NX*NY*NZ$$

Multiplier MI:
  +NX multiplications of calculating step <D29.>: NX calculating clocks
  +NX*NY multiplications of calculating step <D31.>: NX*NY calculating clocks
  +NX*NY*NZ multiplications of calculating step <D33.>: NX*NY*NZ calculating clocks Total number of calculating steps of multiplier MI:

$$NX+NX*NY+NX*NY*NZ$$

Adder AR:
  +NX*NY*NZ additions of calculating step <D34.>: NX*NY*NZ calculating steps Adder AI:
  +NX*NY*NZ additions of calculating step <D35.>: NX*NY*NZ calculating steps Multiplier IMUL:
  +NX*NY multiplications of calculating step <D20.>: NX*NY calculating clocks
  +NX*NY*NZ multiplications of calculating step <D21.>: NX*NY*NZ calculating clocks Total number of calculating steps of multiplier IMUL:

$$NX*NY+NX*NY*NZ$$

Operator Op (can be potentially eliminated, see calculating step <D22.>):
  NX*NY*NZ operations of calculating step <D22.>: NX*NY*NZ calculating clocks Multiplier GMUL:
  NX*NY*NZ multiplications of calculating step <D23.>: NX*NY*NZ calculating steps Adder GADD:
  NX*NY*NZ−1 additions of calculating step <D23.>: NX*NY*NZ−1 calculating clocks As the workload of the individual function blocks for the processing of a supporting point SP shows, the workload of all function blocks in the case of NX>=2 and NY>=2 and NZ>=2 important for practice is less than the value 2*NX*NY*NZ that derives as a result of the calculating clocks given access onto the bus B. All calculating steps can thus be hidden behind the access onto the Cartesian frequency cube by a suitable interleaving. The duration of 2*NX*NY*NZ calculating clocks for processing a supporting point SP represents processing capacity of the VGR-ASIC.

The controller SW controls the interfaces of the VGR-ASIC, controls the executive sequence of the calculations on the function blocks, and assumes the address generation.

The architecture of the VGR-ASIC shown in FIG. 5 is designed such that all calculations of the VGR-ASIC can be hidden behind the accesses onto the memory SKART. The access bandwidth of the VGR-ASIC onto the memory SKART of the Cartesian frequency cube thus determines the processing capacity of the VGR-ASIC.

The maximum access bandwidth of the VGR-ASIC to the Cartesian frequency cube in the memory SKART is reached when the VGR-ASIC has the sole access right to the memory SKART. The time-consuming, indivisible read-modify-write accesses and the necessary arbitration given access to the memory SKART that would derive given access of a plurality of users to the memory SKART are thereby avoided. This represents a significant advantage of the employment of a VGR-ASIC compared to a realization of the 3D gridding algorithm with a multi-processor system wherein a plurality of processors would have to share the access right to the Cartesian frequency cube in the memory SKART. When a plurality of users have access to the memory SKART, the access bandwidth to the memory SKART decreases because of arbitration outlay.

The supporting points SP to be processed can be divided onto NE units En with n=1 through n=NE of VGR-ASICs Gn (according to claim 2) with appertaining memories SKART Sn and SKARTG Sgn in the weighting interpolation and in the 3D gridding. The weighting interpolation and the 3D gridding can thus be processed in parallel on the NE units En. As soon as the weighting interpolation and the 3D gridding have ended on all NE units En, the access of the VGR-ASICs Gn to the memories Sn can be removed. The access onto the memories Sn can then be granted to a different addition unit ADD_S that adds the Cartesian frequency cubes of all NE memories Sn. The result of this addition is the Cartesian frequency cube that arises by taking all supporting points SP to be processed into consideration.

In this case, the implementation of the 3D pre-gridding is implemented y the unit El with all supporting points to be processed. The Cartesian weighting matrix obtained in the unit El, however, must then be copied into the memories SKARTG SG2 through SGNE of the units E2 through ENE before the implementation of the weighting interpolation and of the 3D gridding.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for weighting a plurality of randomly-distributed supporting points in frequency space for applying a 3D gridding procedure to said supporting points in a 3D Fourier image reconstruction in a computed tomography apparatus, said method comprising the steps of:

conducting a 3D pre-gridding of said supporting points for producing a real weighting cube in a Cartesian grid having x, y and z directions by assigning an initial function value of 1.0 to each supporting point and determining respective subsequent function values for each supporting point representing distribution inhomogeneities of the supporting points, each supporting point contributing N values in each of the x, y and z directions to said weighting cube, with said N values in each of the x, y and z directions representing a spacing between a point in the weighting cube and the supporting point which produced said point in the weighting cube by applying respective interpolation tables to each supporting point for each of the x, y and z directions; and assigning a weighting for each supporting point from said points in said weighting cube produced by that supporting point which lie in a selected 3D interpolation window in a 3D gridding procedure, by multiplying each of the points in the weighting cube for a given supporting point by respective interpolation weightings in each of the x, y and z directions to obtain an interpolation result in each direction, and adding said interpolation results.

2. In a computed tomography apparatus, an arithmetic unit for weighting a plurality of randomly-distributed supporting points in frequency space for applying a 3D gridding procedure to said supporting points in a 3D Fourier image reconstruction in a computed tomography apparatus, said method comprising the steps of:

means for conducting a 3D pre-gridding of said supporting points for producing a real weighting cube in a Cartesian grid having x, y and z directions by assigning an initial function value of 1.0 to each supporting point and for determining respective subsequent function values for each supporting point representing distribution inhomogeneities of the supporting points, each supporting point contributing N values in each of the x, y and z directions to said weighting cube, with said N values in each of the x, y and z directions representing a spacing between a point in the weighting cube and the supporting point which produced said point in the weighting cube by applying respective interpolation tables to each supporting point for each of the x, y and z directions; and means for assigning a weighting for each supporting point from said points in said weighting cube produced by that supporting point which lie in a selected 3D interpolation window in a 3D gridding procedure, by multiplying each of the points in the weighting cube for a given supporting point by respective interpolation weightings in each of the x, y and z directions to obtain an interpolation result in each direction, and adding said interpolation results.

3. A computed tomography apparatus as claimed in claim 2 wherein said arithmetic unit comprises an ASIC, and further comprising:

an input databus and an associated first address bus for transferring data to said ASIC including operating mode data during an initialization phase, parameterization values for the 3D gridding algorithm, said function values for the supporting points whose contribution is to be determined by said 3D gridding algorithm, and Cartesian coordinates of supporting points not lying in the Cartesian grid;

a first bi-directional databus and an associated second address bus for supplementing formation of the contributions from the supporting points; and a second bi-directional databus and an associated third address bus for supplementing formation of contributions to the weighting cube in a memory.

4. A computed tomography apparatus as claimed in claim 3 further comprising a Cartesian frequency cube memory connected to said ASIC via said first bi-directional databus and said second address bus, and wherein said ASIC comprises means for conducting said 3D pre-gridding and said weighting hidden behind accesses to said Cartesian frequency cube memory, said Cartesian frequency cube memory having a maximum access bandwidth associated therewith and said ASIC having a calculating capacity for completely using said maximum access bandwidth.

5. A computed tomography apparatus comprising computer means for three-dimensional Fourier reconstruction of an image from measured data, said means for reconstructing an image including an arithmetic unit having a parallel arrangement of a plurality of ASICs, each ASIC having a memory associated therewith, for supplementing formation of contributions to a Cartesian frequency cube obtained from supporting points in said measured data by parallel processing with a division of said supporting points respectively among said plurality of ASICs.

* * * * *